United States Patent
Fontoura et al.

(10) Patent No.: US 9,129,300 B2
(45) Date of Patent: Sep. 8, 2015

(54) USING EXTERNAL SOURCES FOR SPONSORED SEARCH AD SELECTION

(75) Inventors: Marcus Fontoura, Mountain View, CA (US); Vanja Josifovski, Los Gatos, CA (US); Evgeniy Gabrilovich, Sunnyvale, CA (US); Bo Pang, Sunnyvale, CA (US); Yejin Choi, Ithaca, NY (US); Mauricio Riguette Mediano, Cupertino, CA (US)

(73) Assignee: Yahoo! Inc., Sunnyvale, CA (US)

(*) Notice: Subject to any disclaimer, the term of this patent is extended or adjusted under 35 U.S.C. 154(b) by 779 days.

(21) Appl. No.: 12/764,469

(22) Filed: Apr. 21, 2010

(65) Prior Publication Data

US 2011/0264640 A1 Oct. 27, 2011

(51) Int. Cl.
*G06Q 30/02* (2012.01)
*G06F 17/30* (2006.01)

(52) U.S. Cl.
CPC ...... *G06Q 30/0241* (2013.01); *G06F 17/30312* (2013.01); *G06Q 30/0277* (2013.01)

(58) Field of Classification Search
CPC ............... G06Q 30/0241; G06Q 30/0277
USPC ............................. 707/706, 748, 749
See application file for complete search history.

(56) References Cited

U.S. PATENT DOCUMENTS

| | | | |
|---|---|---|---|
| 6,701,318 B2* | 3/2004 | Fox et al. | 707/706 |
| 7,523,087 B1* | 4/2009 | Agarwal et al. | 705/7.29 |
| 7,577,652 B1* | 8/2009 | Rajan et al. | 1/1 |
| 7,966,564 B2* | 6/2011 | Catlin et al. | 715/745 |
| 8,276,086 B2* | 9/2012 | Malden et al. | 715/763 |
| 8,332,269 B2* | 12/2012 | Chatwin et al. | 705/14.71 |
| 8,346,791 B1* | 1/2013 | Shukla et al. | 707/759 |
| 8,463,783 B1* | 6/2013 | Yagnik | 707/737 |
| 8,554,618 B1* | 10/2013 | Gasch | 705/14.4 |
| 8,635,103 B1* | 1/2014 | West et al. | 705/14.4 |
| 2002/0090198 A1* | 7/2002 | Rosenberg et al. | 386/52 |
| 2005/0108001 A1* | 5/2005 | Aarskog | 704/10 |
| 2005/0114198 A1* | 5/2005 | Koningstein et al. | 705/10 |
| 2005/0171946 A1* | 8/2005 | Maim | 707/5 |
| 2006/0123000 A1* | 6/2006 | Baxter et al. | 707/5 |
| 2007/0156520 A1* | 7/2007 | Sharma | 705/14 |
| 2007/0239530 A1* | 10/2007 | Datar et al. | 705/14 |
| 2008/0091526 A1* | 4/2008 | Shoemaker | 705/14 |
| 2008/0189611 A1* | 8/2008 | Ishii | 715/700 |
| 2009/0094175 A1* | 4/2009 | Provos et al. | 706/12 |
| 2009/0112840 A1* | 4/2009 | Murdock et al. | 707/5 |
| 2009/0198607 A1* | 8/2009 | Badger et al. | 705/37 |

(Continued)

OTHER PUBLICATIONS

"Consistent Phrase Relevance Measures," by Yih & Meek. IN: ADKDD'08 (2008). Available at: ACM.*

(Continued)

*Primary Examiner* — Daniel Kinsaul
(74) *Attorney, Agent, or Firm* — Brinks Gilson & Lione

(57) ABSTRACT

A system and a method are provided for using external sources (e.g., landing pages) for sponsored search ad selection. In one example, the system identifies one or more regions of an external source. The one or more regions are relevant to a query. The external source includes a source that includes relevant data that is usable for augmenting an ad selection process. The system extracts one or more features from the one or more regions. The system determines which of the one or more features are relevant for item indexing. The system then augments an item selection process by using the one or more features that are relevant for item indexing.

21 Claims, 7 Drawing Sheets

(56) References Cited

U.S. PATENT DOCUMENTS

| | | | |
|---|---|---|---|
| 2009/0216622 A1* | 8/2009 | Hoashi et al. | 705/10 |
| 2009/0228802 A1* | 9/2009 | Shan et al. | 715/733 |
| 2009/0287672 A1* | 11/2009 | Chakrabarti et al. | 707/5 |
| 2009/0319517 A1* | 12/2009 | Guha et al. | 707/5 |
| 2010/0017293 A1* | 1/2010 | Lung et al. | 705/14.55 |
| 2010/0057536 A1* | 3/2010 | Stefik et al. | 705/10 |
| 2010/0100437 A1* | 4/2010 | Dean et al. | 705/14.52 |
| 2010/0138211 A1* | 6/2010 | Shi et al. | 704/3 |

OTHER PUBLICATIONS

"A Noisy-Channel Approach to Contextual Advertising," by Murdock et al. IN: ADKDD'07 (2007). Available at: ACM.*

\* cited by examiner

300 ↘

| TITLE | Machine Learning |
|---|---|
| BID PHRASE | machine learning |
| SHORT DESCRIPTION | Compare Prices in 101+ stores. Find cheap book prices every time. |

$a$ := TF-logIDF representation of an ad
$CR$ := {[-5,+5] landing page text around any word in $a$}
$RR$ := $\emptyset$
For each candidate region $r_i \in CR$,
   If $cosine\_similarity(a, r_i) > \delta$,
   Then $RR \leftarrow RR \cup r_i$,
Return $RR$ as relevant regions for the given ad

| CENTRAL WORD | CO-OCCURRING WORDS(PMI) |
|---|---|
| mattress | futon(6.4), king(2.95), pillow(4.92) queen(5.64), shopping(2.2), brand(2.5) tempur-pedic(6.66), bunk(5.28), mite(5.79) serta(7.64), sealy(7.79), visco(7.75) platform(4.74), products(1.94), store(2.44) cover(4.1), outlet(3.46), directory(2.4) savings(1.37), topper(5.71), allergen(6.63) |

$a$ := TF-logIDF representation of an ad
$csv$ := compositional semantic vector of an ad
$c$ := TF-logIDF representation of $N$ best entries of $csv$
$CR_+$ := {[-5,+5] landing page text around any word in $a$ or $c$}
$RR_+$ := $\emptyset$
For each candidate region $r_i \in CR_+$,
  If $cosine\_similarity(a, r_i) + cosine\_similarity(c, r_i) > \delta_+$,
  Then $RR_+ \leftarrow RR_+ \cup r_i$,
Return $RR_+$ as relevant regions for the given ad

FIG. 6

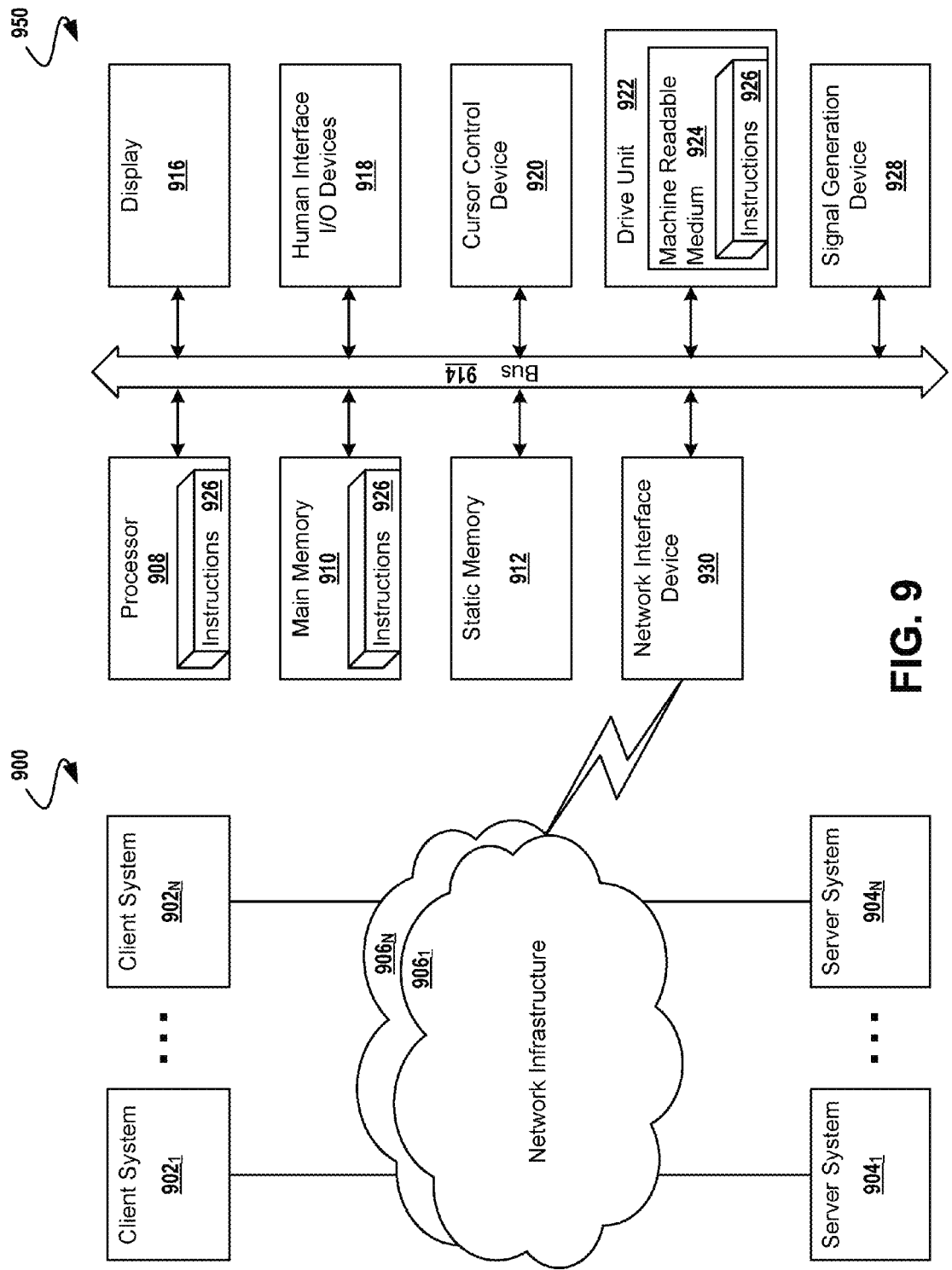

USING EXTERNAL SOURCES FOR SPONSORED SEARCH AD SELECTION

FIELD OF THE INVENTION

The invention relates to online advertising. More particularly, the invention relates to using external sources (e.g., ad landing pages) for sponsored search ad selection.

BACKGROUND

Web search is the gateway to the Internet for billions of users daily. When a user issues a query to a search engine, two separate searches are evaluated: the search over the corpus of pre-crawled Web pages is called Web search; the ads that are displayed at the top and the side of the Web search results are retrieved by sponsored search. Sponsored search provides revenue for the search engine and brings users to numerous advertiser sites.

Web search and sponsored search differ in a few key aspects. Sponsored search is evaluated over a set of ads that promote products and services. As it is customary in the advertising world, the textual content visible to the user (e.g., ad creative), is generated by an advertiser to maximize a response of a target audience. In Web search, on the other hand, the snippet shown on the search result page is generated automatically by the summarization mechanism of the search engine. Another important difference is in the way the ads and the Web results are selected. While the Web pages are selected based on their content, the ad selection depends heavily on the use of an ad bid phrase, which is a query that the advertiser has specified as suitable for the ad. In the early days of the sponsored search marketplace, this mechanism allowed for simple ad selection where the whole burden and control is shifted to the advertiser. However, with the development of the sponsored search market, it has quickly become apparent that the advertisers most likely cannot find all the queries that could be relevant to their ads.

To alleviate this problem the search engines allow for advanced match where an ad can be selected even if the bid phrase does not match the query. The advanced match problem corresponds closer to the Web search problem. Recent advanced match approaches use search techniques for ad selection by evaluating the query over a corpus of documents that are created from the ads. One of the key difficulties in this ad retrieval approach is that the ads are much shorter than documents in most other search applications.

SUMMARY

What is needed is an improved method having features for addressing the problems mentioned above and new features not yet discussed. Broadly speaking, the invention fills these needs by providing a method and a system for using external sources (e.g., landing pages) for sponsored search ad selection.

In a first embodiment, a computer-implemented method is provided for augmenting item selection (e.g., ad selection). The method comprises the following: identifying one or more regions of an external source, wherein the one or more regions are relevant to a query, and wherein the external source includes relevant data that is usable for augmenting an ad selection process; extracting one or more features from the one or more regions; determining which of the one or more features are relevant for item indexing; and augmenting an item selection process by using the one or more features that are relevant for item indexing.

In a second embodiment, a system is provided for augmenting item selection (e.g., ad selection). The system comprises a computer system configured for the following: identifying one or more regions of an external source, wherein the one or more regions are relevant to a query, and wherein the external source that includes relevant data that is usable for augmenting an ad selection process; extracting one or more features from the one or more regions; determining which of the one or more features are relevant for item indexing; and augmenting an item selection process by using the one or more features that are relevant for item indexing.

In a third embodiment, a computer readable medium is provided comprising one or more instructions for augmenting item selection (e.g., ad selection). The one or more instructions are configured for causing one or more processors to perform at least the following steps: identifying one or more regions of an external source, wherein the one or more regions are relevant to a query, and wherein the external source includes relevant data that is usable for augmenting an ad selection process; extracting one or more features from the one or more regions; determining which of the one or more features are relevant for item indexing; and augmenting an item selection process by using the one or more features that are relevant for item indexing.

The invention encompasses other embodiments configured as set forth above and with other features and alternatives. It should be appreciated that the invention may be implemented in numerous ways, including as a method, a process, an apparatus, a system or a device.

BRIEF DESCRIPTION OF THE DRAWINGS

The invention will be readily understood by the following detailed description in conjunction with the accompanying drawings. To facilitate this description, like reference numerals designate like structural elements.

FIG. 3 is an example of an ad, in accordance with some embodiments.

FIG. 4 is an example algorithm for selecting terms from an external source (e.g., landing page) by extracting the relevant regions based on the content of the ad, in accordance with some embodiments;

FIG. 5 is an example of a co-occurrence vector, in accordance with some embodiments;

FIG. 6 shows an example algorithm for extracting relevant regions with the enriched context, in accordance with some embodiments;

FIG. 9 is a diagrammatic representation of a network, including nodes that may comprise a machine within which a set of instructions may be executed, in accordance with some embodiments.

DETAILED DESCRIPTION

Figure 1:
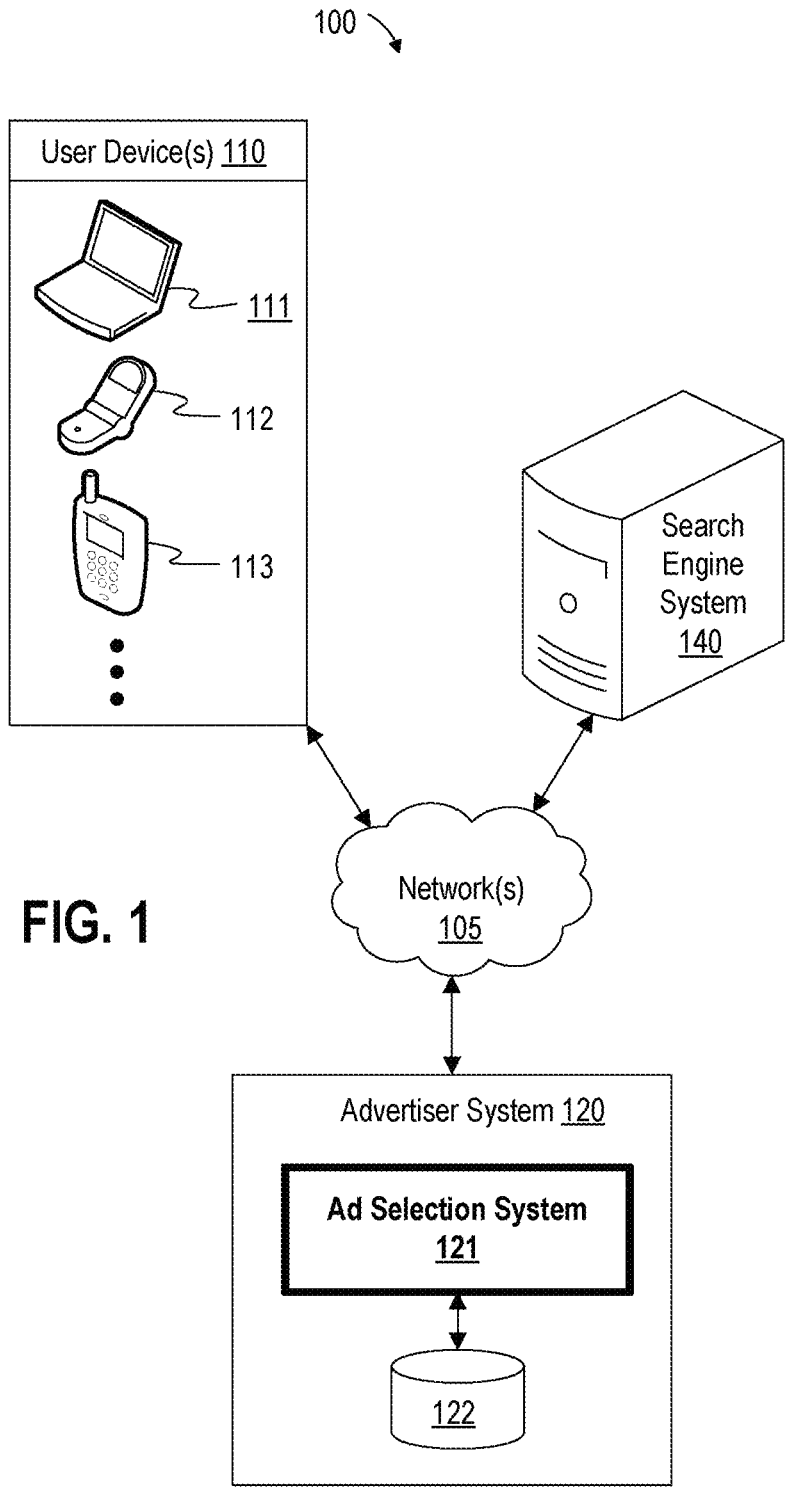
FIG. 1 is a high-level block diagram of a system for augment ad selection, in accordance with some embodiments.

An invention is disclosed for a method and a system for using external sources (e.g., landing pages) for sponsored search ad selection. Numerous specific details are set forth in order to provide a thorough understanding of the invention. It will be understood, however, to one skilled in the art, that the invention may be practiced with other specific details.

Section 1: Definitions

Some terms are defined below in alphabetical order for easy reference. These terms are not rigidly restricted to these definitions. A term may be further defined by its use in other sections of this description.

"Ad" (e.g., ad, item and/or message) means a paid announcement, as of goods or services for sale, preferably on a network, such as the Internet. An ad may also be referred to as an ad, an item and/or a message.

"Ad Server" is a server that is configured for serving one or more ads to user devices. An ad server is preferably controlled by a publisher of a Web site and/or an advertiser of online ads. A server is defined below.

"Advertiser" (e.g., messenger and/or messaging customer, etc.) means an entity that is in the business of marketing a product and/or a service to users. An advertiser may include without limitation a seller and/or a third-party agent for the seller. An advertiser may also be referred to as a messenger and/or a messaging customer. Advertising may also be referred to as messaging.

"Advertising" means marketing a product and/or service to one or more potential consumers by using an ad. One example of advertising is publishing a sponsored search ad on a Website.

"Application server" is a server that is configured for running one or more devices loaded on the application server. For example, an application server may run a device configured for targeting online ads.

"Bid" means keywords for which an advertiser would like to send an ad in a sponsored search. An advertiser may show desire/demand for keywords by adjusting budget constraints within an ad campaign.

"Client" means the client part of a client-server architecture. A client is typically a user device and/or an application that runs on a user device. A client typically relies on a server to perform some operations. For example, an email client is an application that enables a user to send and receive e-mail via an email server. The computer running such an email client may also be referred to as a client.

"Database" (e.g., database system, etc.) means a collection of data organized in such a way that a computer program may quickly select desired pieces of the data. A database is an electronic filing system. In some instances, the term "database" is used as shorthand for "database management system".

"Device" means hardware, software or a combination thereof. A device may sometimes be referred to as an apparatus. Examples of a device include without limitation a software application such as Microsoft Word™, a laptop computer, a database, a server, a display, a computer mouse and/or a hard disk.

"External source" means a source that includes relevant data that may be used to augment an ad and/or an ad selection process. A landing page, defined below, is an example of an external source. Other examples of an external source include without limitation historical data that an advertiser may have about an ad, historical data about an ad campaign, an image without text linked to the ad, a video linked to the ad, and/or other data pertaining to the advertiser and/or the ad. Data pertaining to an advertiser may include, for example, past ads that the advertiser has published.

"Item" means an ad, which is defined above.

"Landing page" means a Web page to which an ad is linked. An example of a landing page is a Web page that provides a description of the product and/or service that is being advertised. For instance, Amazon.com™ provides a multitude of Web pages that have descriptions for products and/or services. A landing page is an example of an external source, which is defined above.

"Marketplace" means a world of commercial activity where products and/or services are browsed, bought and/or sold, etc. A marketplace may be located over a network, such as the Internet. A marketplace may also be located in a physical environment, such as a shopping mall.

"Message" means an ad, which is defined above.

"Messaging" means advertising, which is defined above.

"Messenger" means an advertiser, which is defined above.

"Network" means a connection, between any two or more computers, that permits the transmission of data. A network may be any combination of networks, including without limitation the Internet, a local area network, a wide area network, a wireless network and a cellular network.

"Publisher" means an entity that publishes, on a network, a Web page having content and/or ads, etc.

"Server" means a software application that provides services to other computer programs (and their users), in the same computer or other computer. A server may also refer to the physical computer that has been set aside to run a specific server application. For example, when the software Apache HTTP Server is used as the Web server for a company's Web site, the computer running Apache may also be called the Web server. Server applications may be divided among server computers over an extreme range, depending upon the workload.

"Software" means a computer program that is written in a programming language that may be used by one of ordinary skill in the art. The programming language chosen should be compatible with the computer by which the software application is to be executed and, in particular, with the operating system of that computer. Examples of suitable programming languages include without limitation Object Pascal, C, C++ and Java. Further, the functions of some embodiments, when described as a series of steps for a method, could be implemented as a series of software instructions for being operated by a processor, such that the embodiments could be implemented as software, hardware, or a combination thereof. Computer readable media are discussed in more detail in a separate section below.

"System" means a device or multiple coupled devices. A device is defined above.

"Unique word" means a word that is being read for the first time from a data source. For example, the following sentence has eight unique words and eleven words total: "The red camera has a camera body good for a camera." The words "camera" and "a" are counted only once as being unique.

"User" (e.g., consumer, etc.) means an operator of a user device. A user is typically a person who seeks to acquire a product and/or service. For example, a user may be a woman who is browsing Yahoo!™ Shopping for a new cell phone to replace her current cell phone. The term "user" may refer to a user device, depending on the context.

"User device" (e.g., computer, user computer, client and/or server, etc.) means a single computer or to a network of interacting computers. A user device is a computer that a user may use to communicate with other devices over a network, such as the Internet. A user device is a combination of a hardware system, a software operating system and perhaps one or more software application programs. Examples of a user device include without limitation a laptop computer, a palmtop computer, a smart phone, a cell phone, a mobile phone, an IBM-type personal computer (PC) having an operating system such as Microsoft Windows™, an Apple™ computer having an operating system such as MAC-OS, hardware having a JAVA-OS operating system, and a Sun Microsystems Workstation having a UNIX operating system.

"Web browser" means a software program which can display text, graphics, or both, from Web pages on Web sites. Examples of a Web browser include without limitation Mozilla Firefox™ and Microsoft Internet Explorer™.

"Web page" means documents written in a mark-up language including without limitation HTML (hypertext mark-up language), VRML (virtual reality modeling language), dynamic HTML, XML (extended mark-up language) and/or other related computer languages. A Web page may also refer to a collection of such documents reachable through one specific Internet address and/or through one specific Web site. A Web page may also refer to any document obtainable through a particular URL (Uniform Resource Locator).

"Web server" is a server configured for serving at least one Web page to a Web browser. An example of a Web server is a Yahoo!™ Web server. A server is defined above.

"Web site" means one or more Web pages. A Web site preferably includes plurality of Web pages, virtually connected to form a coherent group.

Section 2: General Overview

The present system is configured for using external source content (e.g., landing page content) in sponsored search ad selection. "External source" means a source that potentially provides relevant data that may be used to augment an ad and/or an ad selection process. A landing page is an example of an external source. "Landing page" means a Web page to which an ad is linked. An example of a landing page is a Web page that provides a description of the product and/or service that is being advertised. For instance, Amazon.com™ provides a multitude of Web pages that have descriptions for products and/or services. A landing page is an example of an external source. Other examples of an external source include without limitation historical data that an advertiser may have about an ad, an image without text linked to the ad, a video linked to the ad, and/or other data pertaining to the advertiser and/or the ad. Data pertaining to an advertiser may include, for example, past ads that the advertiser has published.

Specifically, the system involves the use of the ad's intrinsic content to augment the ad (and/or ad selection process) with the whole, or parts, of the external source (e.g., landing page). The system handles two types of extractive summarization techniques to select useful regions from the external sources: out-of-context methods and in-context methods.

Out-of-context methods select salient regions from the external source by analyzing the content of the external source itself, without taking into account the ad context associated with the external source. The ad context is composed of the creative, bid phrase, title and any other information about the ad that can be computed offline (e.g., prior to query processing).

In-context methods use the ad context (e.g., title, creative, and bid phrases, etc.) to help identify regions of the external source that should be used by the ad selection engine.

In addition, the system is configured for carrying out a simple yet effective unsupervised algorithm to enrich the ad context to further improve the ad selection. The use of external sources can significantly improve the quality of ad selection. Also, the system's extractive summarization techniques may reduce the size of external sources substantially, while retaining or even improving the performance of ad retrieval over the method that utilize the entire external source.

Selective use of external sources can significantly improve the quality of ad selection. The system's extractive summarization techniques reduce the size of external sources substantially, thereby reducing the amount of data that needs to be indexed, while retaining or even improving the performance of ad retrieval over the method that utilize the entire external source.

Important features of the system include without limitation the following. The system is configured for quantifying the benefit of using the external source for ad selection in sponsored search. In particular, the system utilizes a number of different extractive summarization techniques to make the best use of external sources. The system is configured for carrying out a simple yet effective unsupervised algorithm using compositional vector space models to enrich the ad context. The system may carry out two different ways in which the enriched ad context can be utilized to enhance the ad selection.

A large part of the $30 billion Web advertising market includes textual ads, the ubiquitous short text messages usually marked as "sponsored links". There are two main channels for distributing such ads. Sponsored search places ads on the result pages of a Web search engine, where ads are selected to be relevant to the search query. Major Web search engines (e.g., Google™, Microsoft™, Yahoo!™) support sponsored ads and act simultaneously as a Web search engine and an ad search engine. Content match (or contextual advertising) places ads on third-party Web pages. Today, almost all of the for-profit non-transactional Web sites (e.g., without direct sales) rely at least to some extent on contextual advertising revenue. Content match supports sites that range from individual bloggers and small niche communities, to large publishers such as major newspapers.

The present system is directed primarily to sponsored search. However, content match ads are identical to the sponsored search ads. Accordingly, using external source content (e.g., landing page content) for ad selection is applicable to content match as well.

Section 2.1: Architecture Overview

Sponsored search preferably includes interplay of at least three entities: an advertiser system, a search engine system and one or more user devices. The advertiser system provides a supply of ads. The goal of the advertisers may be broadly defined as promotion of products and/or services. The search engine system provides "real estate" for placing ads (e.g., allocates space on search results pages), and selects ads that are relevant to a user's query. The user interacts with a user device to visit the Web pages and interact with the ads.

FIG. 1 is a high-level block diagram of a system 100 for augment ad selection, in accordance with some embodiments. The one or more networks 105 couple together one or more user devices 110, an advertiser system 120, and a search engine system 140. The network 105 may be any combination of networks, including without limitation the Internet, a local area network, a wide area network, a wireless network and/or a cellular network.

Each user device 110 includes without limitation a single computer or a network of interacting computers. Examples of a user device include without limitation a laptop computer 111, a cell phone 112 and a smart phone 113. A user may communicate with other devices over the network 105 by using a user device 110. A user may be, for example, a person browsing or shopping in a marketplace on the Internet.

The search engine system 140 may include without limitation Web servers, application servers, search engines and/or databases. The search engine system 140 is configured for communicating with the user devices 110 and serving at least one Web page to a Web browser on a user device 110. The search engine system 140 is configured for providing online services, including without limitation searching, browsing and/or shopping operations.

The advertiser system 120 includes without limitation ad selection system 121 and a database system 122. The ad selection system 121 may be configured for performing in-context term selection, which is described below in Section 3.1. The ad selection system 121 may also, or alternatively, be configured for term selection out-of-context, which is described below in Section 3.2. The database system 122 is configured for storing data generated by the ad selection system 121.

The ad selection system 121 is configured with programs, algorithms, applications, software, graphical user interfaces, models, other tools and/or other procedures necessary to implement and/or facilitate methods and systems according to embodiments of the invention, or computerized aspects thereof, whether on one computer or distributed among multiple computers or devices. These include local and global adjustment, decision making, or optimizations, weighting, pricing, allocation, scheduling, serving, and/or other techniques. In various embodiments, the elements of the ad selection system 121 may exist on one computer, or may exist on multiple computers, devices and/or locations.

The advertiser system 120 may also include without limitation ad servers, application servers and/or databases. The advertiser system 120 is configured for serving one or more ads to the user devices 110. An ad server system 120 is preferably controlled by a publisher of a Web site and/or an advertiser of online ads. A publisher is an entity that publishes, over the network 105, a Web page having content and/or ads. An advertiser is an entity that is seeking to market a product and/or a service to users at the user devices 110. Examples of a publisher/advertiser include without limitation Amazon.com™, Nike™ and Yahoo!™.

The configuration of the system 100 in FIG. 1 is for explanatory purposes. For example, in some embodiments, the advertiser system 120 may be part of an ad exchange. For example, some Web portals operate, utilize, or facilitate advertising exchanges. Such exchanges may virtually connect parties including advertisers, publishers, networks of advertisers, networks of publishers, and other entities. The exchange may facilitate arrangements, bidding, auctioning in connection with ads and ad campaigns, and may also facilitate planning and serving of ads. Ads that may be included within the exchange may include display or graphical ads that are not served in connection with user searches including keyword-based searches. The exchange may also include sponsored search ads, including ads served in association with user searches, such as keyword searches. Any type of simple or sophisticated ads may be included, such as text, graphic, picture, video and audio ads, streaming ads, interactive ads, rich median ads, etc.

In some embodiments, active ads are ads that are available for serving on or in connection with the exchange, whereas non-active ads are not so available. For example, non-active ads may include ads that are in review prior to be available for serving. This may include review as part of an editorial process to try to ensure or reduce the chance that inappropriate or dangerous ads are not allowed to be active. There are numerous other configurations in other embodiments that are possible.

Section 2.2: Ad Pricing

The prevalent pricing model for textual ads is that the advertisers pay for every click on the ad (pay-per-click or PPC). The amount paid by the advertiser for each sponsored search click is usually determined by an auction process. The advertisers place bids on a search phrase, and their position in the column of ads displayed on the search results page is determined by their bid. Thus, each ad is annotated with one or more bid phrases. In addition to the bid phrase, an ad also contains a title usually displayed in bold font, and a creative, which is the few lines of text, usually shorter than 120 characters, displayed on the page. Each ad typically contains a URL to an external source, such as, for example, a landing page. Landing pages may be classified into at least three main categories: homepage, which are top-level pages on the advertisers' Web site; search transfer, which are dynamically generated search result pages on the advertiser's site; and category browse, which are subsections of the advertiser's site, generally related to the user query.

The present system is configured for using external sources (e.g., landing pages) in the context of an ad retrieval system that is based on information retrieval principles. The input to the system is a search (or "Web") query, and the output is a set of ads that are relevant to this query. The system represents the ads and the queries in a vector space model using their unigrams and phrases as features. The query-ads similarity is computed using the cosine of the angle between their vectors. Assuming that the query vector and the ad vectors are pre-normalized using $L_2$ norm, the scoring function is a simple dot product:

$$\text{score}(\text{query}, ad) = \sum_{f \in ad \cap query} w_{f,ad} w_{f,query} \quad \text{(Equation 1)}$$

where $w_{f,ad}$ and $w_{f,query}$ are the weights of the feature f in the ad and the query accordingly. For weighting of the features, the system uses a section-aware variant of TF-IDF (term frequency-inverse document frequency) weighting where each region of the ad is given a tf (term frequency) multiplier. This weighting scheme can be naturally extended to incorporate new regions of the ad and the query. Examples of such new regions include without limitation the regions in the external source (e.g., landing page), regions in the website associated with the external source, and other data (e.g., images, video and/or historical data). The ads are processed and indexed in an inverted index of ads. The inverted index of ads may be used to evaluate similarity queries by a document-at-the-time algorithm.

Section 3: Summarizing External Sources for Ad Retrieval

The present system is configured for carrying out a number of different ways for extracting information from external sources (e.g., landing pages) that can be used to augment ad indexing and eventually to help with ad selection. Since the extracted information should be a succinct representation of the most useful information in the external source, the extracted information may be viewed as a "summary" of the given page. The extracted information is preferably an adequate summary for the system's ad retrieval tasks.

Figure 2:
FIG. 2 is an example of a landing page, in accordance with some embodiments.

FIG. 2 is an example of a landing page 200, in accordance with some embodiments. A landing page, or other external source, may contain different regions, each focusing on one type of information about the subject matter of the page. For instance, in the example shown in FIG. 2, the landing page 200 is mainly about "Canon EOS Digital Camera". The landing page 200 contains several regions that are directly related to the product: a product-description region, a customer-review region, and a transaction region with information for purchase. The landing page 200 also contains a region with a list of related products—information that is tangentially related to the product being advertised. In addition, there are regions with navigational information that carry no information about the product at all. Not all of these regions are equally important for ad retrieval. An objective of the system is to determine the best way to select information from the correct regions that may help improve ad retrieval.

The system is structured around at least two different hypotheses. The first hypothesis is that a good summary should be defined in the context of the ad intent. For instance, if the intent of a given ad is to provide customer reviews, then a good summary should likewise focus on the customer reviews in the page rather than, say, the transaction information. In contrast, the second hypothesis assumes that a good summary for an external source (e.g., landing page) can be defined solely based on information available in the external source itself, without referring to the content of the ad creative for the ad intent.

In what follows, in-context term selection refers to summarization of external sources (e.g., landing pages) based on the first hypothesis, and out-of-context term selection refers to approaches based on the second hypothesis. Note that an end goal is not to produce a human readable summary of a Web page. Rather, an end goal is to extract those features (e.g., terms) from the external sources that can assist ad selection.

Section 3.1: In-Context Term Selection

The system handles the first hypothesis by introducing two variants of an algorithm that select relevant regions in the external source (e.g., landing page) within the context of the ad intent. Both use one or more "seed words" representing the ad intent to help select relevant regions. In the first and simpler variant, the system is configured for using only words from the ad content to represent the ad intent. In the second variant, the system is configured for using an extended set of words. The description below starts with the first and simpler variant.

Section 3.1.1: Extracting Relevant Regions

FIG. 3 is an example of an ad 300, in accordance with some embodiments.

FIG. 4 is an example algorithm 400 for selecting terms from an external source (e.g., landing page) by extracting the relevant regions based on the content of the ad, in accordance with some embodiments.

The system uses the TF-IDF (term frequency-inverse document frequency) weighting model to represent ads. The textual information that the system utilizes in an ad typically includes without limitation three components: a title, a short description, and a bid phrase. Referring to FIG. 3, terms that are repeated across different components (e.g., "machine" and "learning") tend to be more important than words that are repeated inside only one component (e.g., "prices"). Accordingly, for the computation of term frequency, the system counts the number of components that term appears in. Similarly, the system treats each ad component as a separate document in an ad corpus for the computation of document frequency. The resulting vector may be referred to as an ad vector.

Next, the system locates candidate regions in a given external source (e.g., landing page) in the context of the ad vector. For any word in the external source that also appears in the ad vector, the system constructs a text span window (e.g., [−5, +5] character window). The system analyzes one or more candidate regions of the external source by using the text span window as a candidate region. For each candidate region, the system computes the cosine similarity between the candidate region and the ad vector. The system merges candidate regions whose similarity scores are above a predetermined threshold δ. The resulting regions are relevant regions for a given ad.

One natural concern regarding this approach is that some good regions might not be selected as relevant due to the vocabulary mismatch between the ad and the corresponding external source (e.g., landing page), because textual information given in an ad has to be substantially succinct.

In order to address such concern, the system next introduces an algorithm that extends the ad vector into a richer context. The system starts by building co-occurrence vectors of words appearing in an ad corpus, as discussed below in Section 3.1.2. Using the co-occurrence vectors for substantially all words in a given ad, the system then composes a semantic vector that represents the collective semantic meaning of the ad intent, as discussed below in Section 3.1.3. Finally, the system uses the resulting semantic vector, in conjunction with the original ad vector, to assist in extracting relevant regions from the external source (e.g., landing page), as discussed below in Section 3.1.4.

Section 3.1.2: Building Co-occurrence Vectors from Ad Corpus

In order to overcome the vocabulary mismatch problem, the system builds co-occurrence vectors from an ad corpus that contained over half million ads. Again, each of the textual ad components (e.g., title, short description, and bid phrase) is treated as a separate pseudo-document d. The co-occurrence count for a pair of words u and w is defined as the number of pseudo-documents the pair co-appears in:

$$cooc_{cnt}(u,w)=|\{d|u\in d \wedge w\in d\}| \qquad \text{(Equation 2)}$$

The system discards stop-words and infrequent words (those that appear in the corpus fewer than 4 times). The system then forms the co-occurrence vector for each word u as $$cooc_{vec}(u)=\{cooc_{cnt}(u,w)>0\} \qquad \text{(Equation 3)}$$

The system keeps only those with $|cooc_{vec}(u)| \geq 3$.

For all $w \in cooc_{vec}(u)$, the system computes its point-wise mutual information (PMI) to u. The definition of PMI is given as follows:

$$PMI(u, w) = \log \frac{\frac{c_{uw}}{N}}{\frac{\sum_{i=1}^{n} c_{iw}}{N} \times \frac{\sum_{j=1}^{n} c_{uj}}{N}} \qquad \text{(Equation 4)}$$

where $c_{uw}$ is the number of times u and w co-occurred, n is the number of unique words, and N is the total word occurrences.

FIG. 5 is an example of a co-occurrence vector 500, in accordance with some embodiments. The co-occurrence vector for u="mattress" is given in FIG. 5. The PMI scores are shown in the parentheses. PMI scores reflect how informative a co-occurring word is for u. That is, those with higher PMI scores (e.g., "futon", "tempur-pedic", "serta") are generally more informative than words with lower PMI scores (e.g., "shopping", "products", "savings").

For each u, the system also computes the average PMI score for it as $$avg_{PMI}(u) = \frac{\sum_{w \in cooc_{vec}(u)} PMI(u, w)}{|cooc_{vec}(u)|}, \quad \text{(Equation 5)}$$

where $avg_{PMI}(u)$ represents how "specific" u is. That is, if u co-occurs with many words with low PMI scores, then u is likely to have appeared in many different contexts and domains. For example, such words tend to act like stop words in the ad corpus. The system adds the 50 words with the lowest average PMI scores to the existing stop-word list. Examples of such words included without limitation "find", "search", "save", "free", etc. The system then rebuilds the co-occurrence vectors using the extended stop-word list.

Section 3.1.3: Computing Compositional Semantic Vectors to Enrich Ad Context

Having constructed co-occurrence vectors for each word u in a given ad, the next question is how to combine them into one vector that captured the ad intent. Let $\{u_i\}$ be the bag-of-words representation of an ad, and $V=\{v_1, \ldots, v_n\}$ be the set of PMI based co-occurrence vectors for this ad, such that $v_i = \{v_{ij} | j \in cooc_{vec}(u_i)\}$ and $v_{ij}$ is set to the PMI value between the ad word $u_i$ and j. The system is configured for different ways to compose these vectors into one single vector, which is referred to as the compositional semantic vector (csv) for the given ad:

$$csv = f(v_1, \ldots, v_n) \quad \text{(Equation 6)}$$

The need for vector composition arises often in information retrieval (IR) and national language processing (NLP). However, need for vector composition has rarely been the main focus of research until recently. As such, the choice of composition function has been rather arbitrary. The popular choices have been Component-wise vector averaging or component-wise vector addition. The vector composition may be viewed in light of compositional semantics, where the meaning of the whole is a function of the meaning of its parts. This principle of compositionality has been a fundamental presupposition in some of the branches of mathematics, linguistics and philosophy. Researchers have extended this insight by comparing various compositional operations in broader NLP applications.

The present system is configured for handling this problem in the context of ad retrieval. In particular, the system is configured for different vector compositions in order to compose a semantic vector representation for a given ad. One vector composition that has been used often is component-wise vector addition:

$$csv_j = \sum_i v_{ij} \quad \text{(Equation 7)}$$

where, $csv_j$ and $v_{ij}$ are jth components of vector csv and $v_i$, respectively. Another compositional vector operation can be component-wise vector multiplication as shown below.

$$csv_j = \prod_i v_{ij} \quad \text{(Equation 8)}$$

It is possible that a component-wise vector multiplication is an operation that has been rarely used, but a component-wise vector multiplication is conceptually more desirable for meaning composition because multiplication picks out the content relevant to the combination by scaling each component more explicitly.

It might be desirable that each word should contribute differently to the overall meaning. This is particularly the case in tasks of the present system. For instance, in FIG. 3, the words "Compare" and "Find" are not as informative as the word "book" when distinguishing the given ad from others. In fact, words such as "Compare" or "Find" might appear in almost all ads, regardless of the type of object being advertised. Therefore, such uninformative words should make relatively smaller contribution when composing the semantic meaning of the overall ad. To address this issue, the system weighs the contribution of each co-occurrence vector by its average PMI scores, as defined above in Section 3.1.2. Equation 6 and Equation 3 are then modified as follows:

$$csv_j = \sum_i avg_{PMI}(u_i) v_{ij} \quad \text{(Equation 9)}$$

$$csv_j = \prod_i avg_{PMI}(u_i) v_{ij} \quad \text{(Equation 10)}$$

Note that the resulting vector csv of Equation 50 is equivalent to that of Equation 8 modulo normalization.

It is undesirable for weights to be defined based on the syntax and semantic role of each word in a given sentence. Such weighting scheme is not suitable for ad retrieval for two reasons. First, languages used in ad are succinct and often are not complete or valid sentences. Therefore, it can be hard to determine the semantic role of each word reliably in an ad. Second, the system often needs to weight words in the same syntactic category differently. For instance, in FIG. 3, both "prices" and "book" are nouns, and used as objects of verbs. However, the word "prices" is not as informative as "book".

Note that there is the effect of zeros in the multiplications. This is less of a problem if composing only two vectors. However, when composing more than two vectors, if a word does not appear in substantially all of the vectors, then the word's value in the csv is zero. To address this problem, the system adopts a smoothing scheme:

$$csv_j = \prod_i^{smoo} avg_{PMI}(u_i) v_{ij} \quad \text{(Equation 11)}$$

where the operation $\Pi_i^{smoo}$ replaces $v_{ij}$ with a smoothing factor $\mu$ whenever $v_{ij}=0$.

There are other compositional operations as well. For simplicity, consider two vectors $v_1$ and $v_2$, where the length of each vector is given as $m_1$ and $m_2$, respectively. One example is a tensor product, where the resulting vector is a matrix U with dimensionality $m_1 * m_2$, and the component $U_{i,j}$ of the matrix is given as $U_{i,j} = v_{1i} * v_{1j}$. Tensor product is not practically useful for ad retrieval, as the dimensionality of the composed vector explodes exponentially. Another compositional operation is circular convolution, where the resulting vector u is given as $u_i = \Sigma_i v_{1j} v_{2i-j}$. In this case, the dimensionality of the resulting vector is manageable, but the computational cost is much heavier than component-wise operations (e.g., Equation 2 through Equation 6). Also, the performance of convolution is not better than other simpler alternatives. Therefore, the present system preferably involves only component-wise operations.

Section 3.1.4: Extracting Relevant Regions with Compositional Semantic Vectors

FIG. 6 is an example algorithm 600 for extracting relevant regions with the enriched context, in accordance with some embodiments. First, the system represents the content of the ad with the ad vector, as described above in Section 3.1.1. The system then computes the compositional semantic vector (csv) of the given ad, as described above in Section 3.1.3. The system keeps the top N entries with highest scores in the compositional semantic vector (csv) in order to keep the size of the compositional semantic vector (csv) similar to that of the ad vector, where N is a positive integer. This is to ensure that the extended vector will not be dominated by the compositional semantic vector (csv), which could potentially introduce topic shift.

Note that some of the compositional operations involve component-wise multiplications among multiple vectors (e.g., Equation 5 and Equation 6). As a result, the distribution of scores across different entries can be undesirably skewed. Thus, before combining the csv with the ad vector, the system computes the TF-IDF score for each of these N entries in csv in the same way TF-IDF scores are computed for ad vectors. Terms that do not appear in the ad receive a tf score of 1.

Once the system computes the converted compositional semantic vector c, the system determines the candidate regions in the external source (e.g., landing page) in a way similar to what is described above in Section 3.1.1. For any word in the external source that also appears in either a or c, the system considers the text span in a character window (e.g., [−5, +5] character window) as a candidate region. For each candidate region, the system computes the cosine similarity between the candidate region and the ad vector, as well as the cosine similarity between the candidate region and the converted compositional semantic vector. If the sum of the two cosine similarity scores is above a certain threshold $\delta_+$, then the system selects the candidate region as a relevant region. Accordingly, the overall algorithm 600 given in FIG. 6 is similar to the algorithm 400 given in FIG. 4, except the algorithm 600 in FIG. 6 incorporates the compositional semantic vector (csv) of the given ad in order to complement the succinct language of the ad.

Section 3.2: Term Selection Out of Context

The system may be configured to extract a summary-like representation (e.g., relevant terms) of an external source (e.g., landing page) without consulting the ad associated with the given external source. For example, the system may select relevant terms from a landing page while the ad associated (e.g., linked) with the given external source is out of context from the selection of the terms.

One strategy is taking into consideration the top portion of the external source as a summary. Albeit simple, this method is known to be very effective, and often a hard baseline to beat. The system may take into consideration up to N unique words that appear first in the given external source, where N is a positive integer.

A next strategy is for the system to take up to N unique words that are the most representative of the external source. The system preferably uses TF-IDF weighting to extract such words.

As an extreme case, the system may take substantially all words from the entire external source. However, this option is not practically as attractive because this option does not reduce the amount of data that needs to be indexed.

Section 4: Overview of Method for Augmenting Ad Selection

Figure 7:
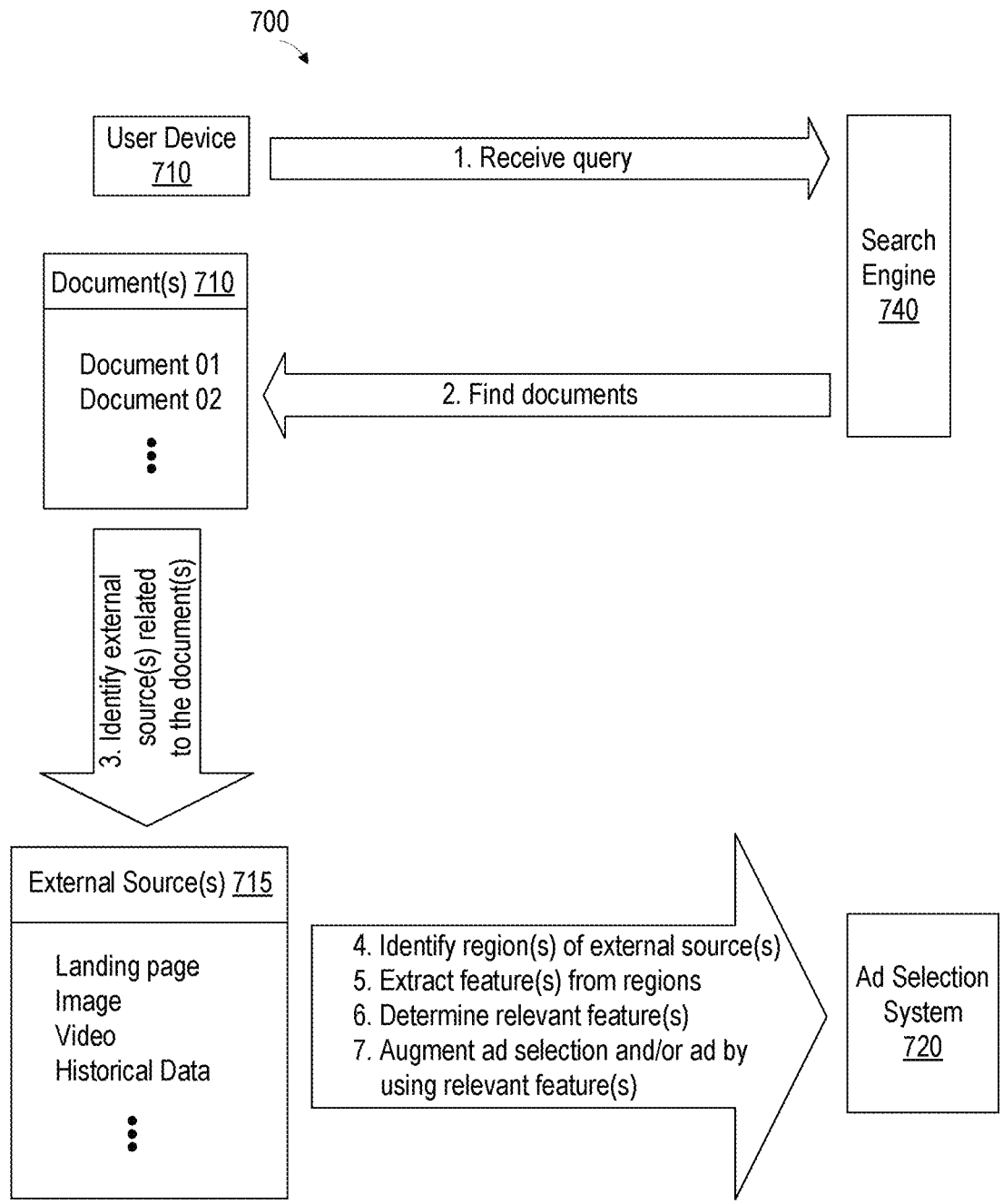
FIG. 7 is a schematic diagram of a system for augmenting selection, in accordance with some embodiments.

FIG. 7 is a schematic diagram of a system 700 for augmenting selection, in accordance with some embodiments. The search engine 740 receives a query from a user device 710. The system 700 finds one or more documents 710 that are related to the query. The documents 710 may be, for example, the result of a search performed by the search engine 740. The documents 710 may include, for example, document_01, document_02, etc.

The system 700 identifies one or more external sources that are related to the one or more documents 710 of the search results. Examples of an external source 715 include without limitation a landing page, an image, a video and/or historical data. The system 700 identifies one or more regions, of the external sources, that are relevant to the query. The system 700 extracts features from the relevant regions. The system 700 determines which features of the relevant regions are relevant for indexing ads. The system 700 may also, or alternatively, determine which features of the relevant regions are irrelevant for indexing ads. The system 700 then uses the relevant features to augment ad selection and/or to augment a given ad.

Figure 8:
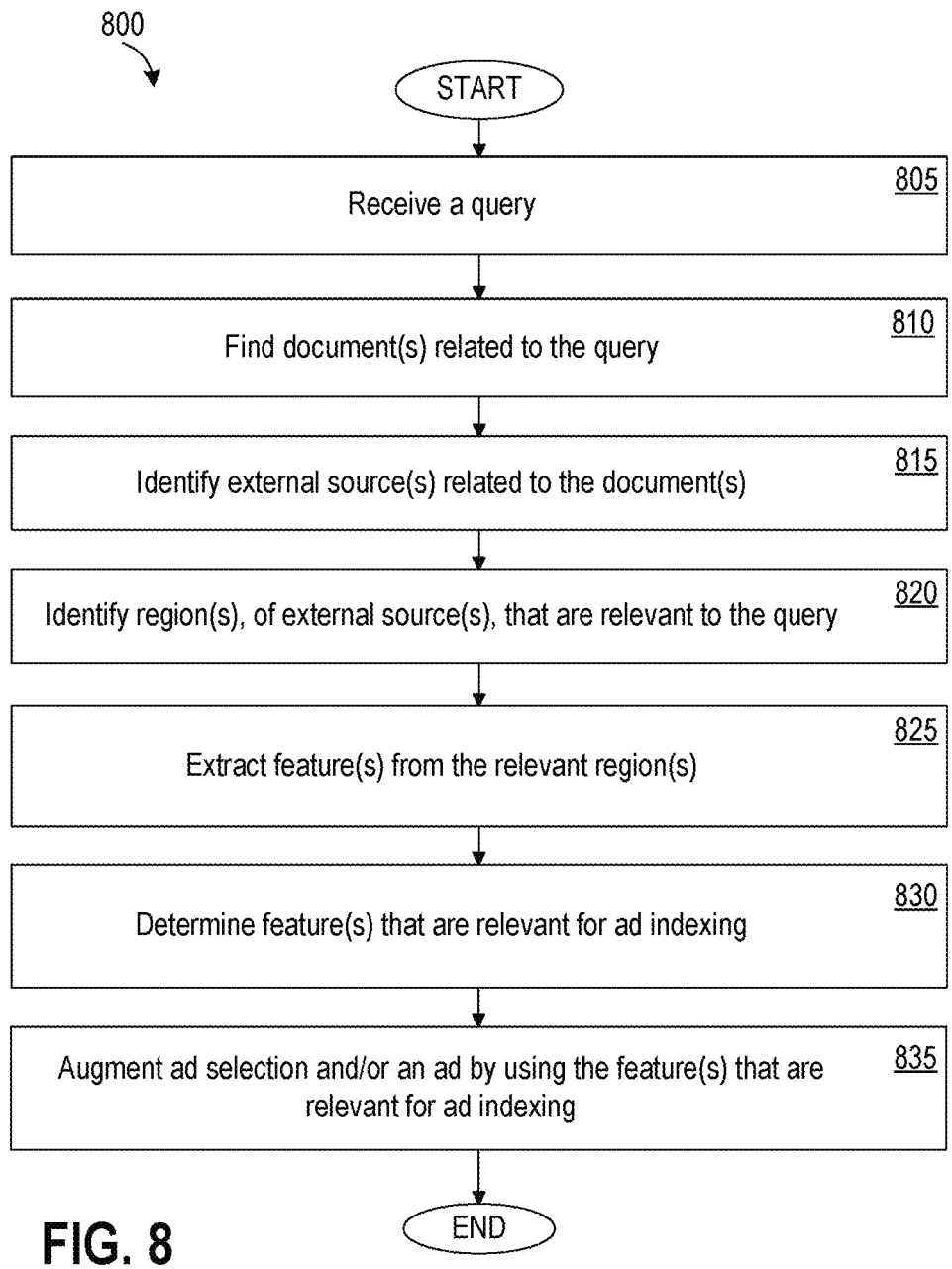
FIG. 8 is a flowchart of a method for augmenting ad selection, in accordance with some embodiments.

FIG. 8 is a flowchart of a method 800 for augmenting ad selection, in accordance with some embodiments. The steps of the method 800 may be carried out by one or more devices of the system 100 of FIG. 1.

The method 800 starts in a step 805 where the system receives a query. For example, the system may receive a query from a user device. The method 800 moves to a step 810 where the system finds one or more documents that are related to the query. For example, the system may perform a search on the Internet to find documents related to the query. The method 800 proceeds to a step 815 where the system identifies one or more external sources (e.g., landing pages) that are related to the documents. Next, in a step 820, the system identifies one or more regions, of the external sources, that are relevant to the query. The method 800 then moves to a step 825 where the system extracts features (e.g., relevant data) from the relevant regions. Then, in a step 830, the system determines which features of the relevant regions are relevant for indexing ads. The method 800 then proceeds to a step 835 where the system augments an ad selection process and/or a given ad by using the relevant features of the relevant regions. The method 800 concludes after the step 835.

Note that the method 800 may include other details and steps that are not discussed in this method overview. Other details and steps are discussed with reference to the appropriate figures and may be a part of the method 800, depending on the embodiment.

Section 5: Exemplary Network, Client, Server and Computer Environments

FIG. 9 is a diagrammatic representation of a network 900, including nodes for client systems $902_1$ through $902_N$, nodes for server systems $904_1$ through $904_N$, nodes for network infrastructure $906_1$ through $906_N$, any of which nodes may comprise a machine 950 within which a set of instructions, for causing the machine to perform any one of the techniques discussed above, may be executed. The embodiment shown is exemplary, and may be implemented in the context of one or more of the figures herein.

Any node of the network 900 may comprise a general-purpose processor, a digital signal processor (DSP), an application specific integrated circuit (ASIC), a field programmable gate array (FPGA) or other programmable logic device, discrete gate or transistor logic, discrete hardware components, or any combination thereof capable to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration, etc).

In alternative embodiments, a node may comprise a machine in the form of a virtual machine (VM), a virtual server, a virtual client, a virtual desktop, a virtual volume, a network router, a network switch, a network bridge, a personal digital assistant (PDA), a cellular telephone, a Web appliance, or any machine capable of executing a sequence of instructions that specify actions to be taken by that machine. Any node of the network may communicate cooperatively with another node on the network. In some embodiments, any node of the network may communicate cooperatively with every other node of the network. Further, any node or group of nodes on the network may comprise one or more computer systems (e.g., a client computer system, a server computer system) and/or may comprise one or more embedded computer systems, a massively parallel computer system, and/or a cloud computer system.

The computer system 950 includes a processor 908 (e.g., a processor core, a microprocessor, a computing device, etc.), a main memory 910 and a static memory 912, which communicate with each other via a bus 914. The machine 950 may further include a display unit 916 that may comprise a touchscreen, or a liquid crystal display (LCD), or a light emitting diode (LED) display, or a cathode ray tube (CRT). As shown, the computer system 950 also includes a human input/output (I/O) device 918 (e.g. a keyboard, an alphanumeric keypad, etc), a pointing device 920 (e.g., a mouse, a touch screen, etc), a drive unit 922 (e.g., a disk drive unit, a CD/DVD drive, a tangible computer readable removable media drive, an SSD storage device, etc.), a signal generation device 928 (e.g., a speaker, an audio output, etc.), and a network interface device 930 (e.g., an Ethernet interface, a wired network interface, a wireless network interface, a propagated signal interface, etc.).

The drive unit 922 includes a machine-readable medium 924 on which is stored a set of instructions 926 (e.g., software, firmware, middleware, etc.) embodying any one, or all, of the methodologies described above. The set of instructions 926 is also shown to reside, completely or at least partially, within the main memory 910 and/or within the processor 908. The set of instructions 926 may further be transmitted or received via the network interface device 930 over the network bus 914.

It is to be understood that embodiments of this invention may be used as, or to support, a set of instructions executed upon some form of processing core (such as the CPU of a computer) or otherwise implemented or realized upon or within a machine- or computer-readable medium. A machine-readable medium includes any mechanism for storing or transmitting information in a form readable by a machine (e.g., a computer). For example, a machine-readable medium includes read-only memory (ROM); random access memory (RAM); magnetic disk storage media; optical storage media; flash memory devices; electrical, optical or acoustical or any other type of media suitable for storing information.

Section 6: Advantages

The present system involves a number of extractive summarization techniques for external sources (e.g., landing pages) in order to enhance sponsored search ad retrieval. The system is based on a contrast of two hypotheses: (1) in-context methods and out-of-context methods may be used to summarize external sources with respect to the ad intent, and (2) in-context summarization techniques are more effective for improving sponsored search. Applying extractive summarization techniques to external sources can reduce the amount of data that needs to be indexed significantly, while retaining or even improving the performance of ad retrieval over methods that utilize the entire external source.

The present system utilizes compositional vector space models in the context of ad retrieval. The system may utilize a range of compositional vector operations that combine co-occurrence vectors to enrich the succinct ad. The system may utilize at least two different ways for enriching ad context. First, the system may extract more useful regions in the external source with respect to the ad intent. Second, the enriched ad context can be a useful resource on its own to reduce the vocabulary mismatch.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer-implemented method for selecting an advertisement, the method comprising:
   receiving, by a processor, a search query;
   identifying, by a processor, a landing page that is related to one or more documents returned in response to the search query, the landing page comprising content relevant to an advertisement;
   determining that one or more words in the landing page also appear in an ad vector representing the advertisement;
   constructing a text span window as a candidate region for each of the said one or more words,
   of the one or more text span windows comprises a text span window vector;
   determining, by a processor, a vector similarity between each of the plurality of text span window vectors and the ad vector; and
   when the similarity in a candidate region and the ad vector is above a predetermined threshold:
      selecting, by a processor, the candidate region;
      extracting terms from the selected candidate regions; and
      augmenting selection of the advertisement by indexing the advertisement using the extracted terms.

2. The computer-implemented method of claim 1, wherein the plurality of candidate regions are selected within the context of an ad intent of the advertisement, and wherein the computer-implemented method further comprises:
   representing, by a processor, the ad intent by using one or more seed words,
   wherein the one or more seed words are used to select the plurality of candidate regions.

3. The computer-implemented method of claim 2, wherein the ad vector is a semantic vector that represents a collective semantic meaning of the ad intent.

4. The computer-implemented method of claim 2, further comprising representing, by a processor, the advertisement by using a TF-IDF weighting model.

5. The computer-implemented method of claim 2, wherein the ad vector comprises textual information that includes at least one of the following components:
   a title;
   a short description; and
   a bid phrase.

6. The computer-implemented method of claim 5, further comprising:

computing, by a processor, a cosine similarity between the text span window vector of each of the plurality of candidate regions and the ad vector; and merging, by a processor, candidate regions whose cosine similarity scores are above a predetermined threshold.

7. The computer-implemented method of claim 5, further comprising at least one of:
   extending, by a processor, the ad vector into a richer context;
   building, by a processor, co-occurrence vectors of words appearing in an advertisement corpus;
   composing, by a processor, a semantic vector that represents a collective semantic meaning of the advertisement intent; and
   extracting, by a processor, relevant regions from the landing page by using the semantic vector and the advertisement vector.

8. The computer-implemented method of claim 1, further comprising:
   taking, by a processor, a top portion of the landing page as a summary of the landing page, and wherein taking the top portion includes considering up to N unique words that appear in the top portion of the landing page, and wherein N is a positive integer.

9. The computer-implemented method of claim 1, further comprising at least one of:
   considering, by a processor, up to N unique words that are most representative of the landing page; and
   extracting, by a processor, the N unique words by using TF-IDF weighting.

10. The computer-implemented method according to claim 1, wherein the text span window comprises a plurality of words in the landing page that are adjacent to each other, wherein at least one word of the plurality of words also appears in the ad vector.

11. A system for selecting an advertisement, the system comprising:
    a computer system, comprising at least one processor and memory, the computer system being configured to:
    receive a search query;
    identify a landing page that is related to one or more documents returned in response to the search query, the landing page comprising content relevant to an advertisement;
    determine that one or more words in the landing page also appear in an ad vector representing the advertisement;
    construct a text span window as a candidate region for each of the said one or more words,
    wherein each of the one or more text span windows comprises a text span window vector;
    determine a vector similarity between each of the plurality of text span window vectors and the ad vector; and
    when the similarity of a candidate region and the ad vector is above a predetermined threshold:
    select the candidate region;
    extract terms from the selected candidate regions; and
    augment selection of the advertisement by indexing the advertisement using the extracted terms.

12. The system of claim 11, wherein the plurality of candidate regions are further relevant within the context of an ad intent of the advertisement, and wherein the computer system is further configured to:
    represent the ad intent by using one or more seed words, wherein the one or more seed words are used to select the plurality of candidate regions.

13. The system of claim 12, wherein the ad vector is a semantic vector that represents a collective semantic meaning of the ad intent.

14. The system of claim 12, wherein the computer system is further configured to represent the advertisement by using a TF-IDF weighting model.

15. The system of claim 12, wherein the ad vector comprises textual information that includes at least one of the following components:
    a title;
    a short description; and
    a bid phrase.

16. The system of claim 15, wherein the computer system is further configured to perform:
    compute a cosine similarity between each of the plurality of candidate regions and the ad vector; and
    merge candidate regions whose cosine similarity scores are above a predetermined threshold.

17. The system of claim 15, wherein the computer system is further configured to perform at least one of:
    extend the ad vector into a richer context;
    build co-occurrence vectors of words appearing in an advertisement corpus;
    compose a semantic vector that represents a collective semantic meaning of the advertisement intent; and
    extract relevant regions from the landing page by using the semantic vector and the advertisement vector.

18. The system of claim 11, wherein the computer system is further configured to:
    take a top portion of the landing page as a summary of the landing page, and wherein to take the top portion of the landing page, the computer system is further configured to consider up to N unique words that appear in the top portion of the landing page, where N is a positive integer.

19. The system of claim 11, wherein the computer system is further configured to perform at least one of:
    consider up to N unique words that are most representative of the landing page; and
    extract the N unique words by using TF-IDF weighting.

20. The system according to claim 11, wherein the text span window comprises a plurality of words in the landing page that are adjacent to each other, wherein at least one word of the plurality of words also appears in the ad vector.

21. A non-transitory computer readable medium comprising one or more instructions for augmenting item selection, wherein the one or more instructions are configured to cause one or more processors to perform acts of:
    receiving a search query;
    identifying a landing page that is related to one or more documents returned in response to the search query, the landing page comprising content relevant to an advertisement;
    determining that one or more words in the landing page also appear in an ad vector representing the advertisement;
    constructing a text span window as a candidate region for each of the said one or more words,
    wherein each of the one or more text span windows comprises a text span window vector;
    determining a vector similarity between each of the plurality of text span window vectors candidate and the ad vector; and
    when the similarity of a candidate region and the ad vector is above a predetermined threshold:
    selecting the candidate region;
    extracting terms from the selected candidate regions; and
    augmenting selection of the advertisement by indexing the advertisement using the extracted terms.

* * * * *